(12) United States Patent
Lu et al.

(10) Patent No.: US 8,547,945 B2
(45) Date of Patent: Oct. 1, 2013

(54) METHOD FOR PROCESSING BEARER IN SERVING GATEWAY

(75) Inventors: Fei Lu, Shenzhen (CN); Jinguo Zhu, Shenzhen (CN); Shuang Liang, Shenzhen (CN); Jing Wang, Shenzhen (CN); Minya Ye, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 247 days.

(21) Appl. No.: 12/992,721

(22) PCT Filed: May 12, 2009

(86) PCT No.: PCT/CN2009/071768
§ 371 (c)(1),
(2), (4) Date: Jan. 25, 2011

(87) PCT Pub. No.: WO2009/138032
PCT Pub. Date: Nov. 19, 2009

(65) Prior Publication Data
US 2011/0110350 A1    May 12, 2011

(30) Foreign Application Priority Data

May 16, 2008   (CN) .......................... 2008 1 0094767

(51) Int. Cl.
*H04W 4/00*     (2009.01)
*H04W 84/12*    (2009.01)
(52) U.S. Cl.
CPC ..................... *H04W 84/12* (2013.01)
USPC .......................................... 370/338; 370/389

(58) Field of Classification Search
USPC ................................. 370/338, 389–392, 401
See application file for complete search history.

(56) References Cited

U.S. PATENT DOCUMENTS

| 2006/0018304 A1 | 1/2006 | Nguyen et al. | |
| 2009/0207812 A1* | 8/2009 | Gupta et al. | 370/332 |
| 2009/0239526 A1* | 9/2009 | Zhao et al. | 455/424 |
| 2009/0252149 A1 | 10/2009 | Zhu et al. | |

FOREIGN PATENT DOCUMENTS

| CN | 1567775 A | 1/2005 |
| CN | 1925632 A | 3/2007 |
| CN | 101282511 A | 10/2008 |

* cited by examiner

*Primary Examiner* — Kan Yuen
(74) *Attorney, Agent, or Firm* — Christopher L. Parmelee; Walker & Jocke (57) ABSTRACT

The present invention provides bearer processing methods, in one bearer processing method, the serving gateway receives a bearer processing message from a mobility management unit, wherein the bearer processing message carries a message source mark for identifying a sending entity of the bearer processing message; the serving gateway acquires the message source mark in the bearer processing message, and judges the sending entity of the bearer processing message according to the message source mark, and performs the bearer processing according to the result of the judgment. In accordance with the present invention, it is possible for the serving gateway to distinguish the sending entity of a message, so as to perform the subsequent related bearer processing.

11 Claims, 7 Drawing Sheets

METHOD FOR PROCESSING BEARER IN SERVING GATEWAY

FIELD OF THE INVENTION

The present invention relates to communication field, and more particularly to a bearer processing method.

BACKGROUND OF THE INVENTION

With the booming of the World Interoperability for Microwave Access (WiMax), the third generation mobile communication system has to improve its network performance and reduce costs of the network construction and operation to maintain its powerful competence in the mobile communication field. Therefore, the standardization workgroup of the 3rd Generation Partnership Project (3GPP) is currently focusing on the research of the evolution of the Packet Switch Core (PS Core) and the Universal Mobile Telecommunication System Radio Access Network (UTRAN) as the research project is called System Architecture Evolution (SAE) aiming at higher transmission rate, shorter transmission time delay, optimized packet, and support of mobility management among the Evolved UTRAN (E-UTRAN), UTRAN, Wireless Local Area Network (WLAN) and other non-3GPP access networks provided by the Evolved Packet Core (EPC).

Figure 1:
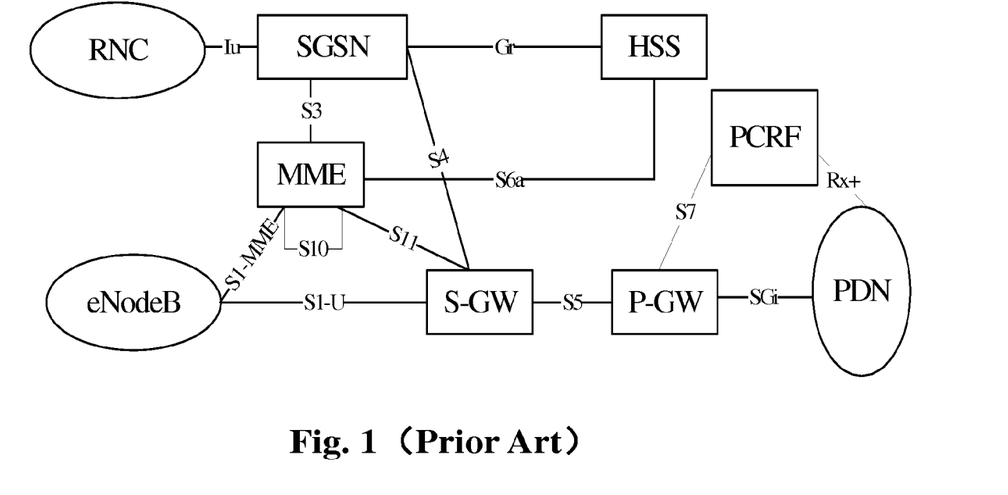
FIG. 1 is a schematic diagram of a structure of the evolved packet network system in accordance with the related art.

The current architecture of the SAE is as shown in FIG. 1, and contains the following network elements:

an Evolved RAN (E-RAN): an Evolved Radio Access Network, providing higher uplink/downlink rate, lower transmission delay and more reliable wireless transmission. The network element included in the E-RAN is an Evolved NodeB (eNodeB) for providing the user access with wireless resources;

a Packet Data Network (PDN): a network for providing users with services;

an E-Packet Core: an evolved packet network for providing lower delay and allowing accesses of more radio access systems. It contains the following network elements:

a Mobility Management Entity (MME), a control plane function entity, a server for storing user data temporarily, being responsible for managing and storing the context of a User Equipment (UE) (e.g. identification of the UE/user, mobility management status, and user security parameter etc), allocating temporary identifications to users, when the UE is located in the tracking area or the network, performing authentication to the user, processing all non-access-stratum messages between the MME and the UE, and triggering the paging in the SAE. The MME is a mobility management unit of the SAE system. In the UMTS system, the mobility management unit is a Serving General Packet Radio Service (GPRS) Support Node (SGSN);

a Serving Gateway (S-GW): this gateway is a user plane entity, being responsible for processing the user plane data routing, and terminating the downlink data of the UE in an idle (ECM_IDLE) state, managing and storing the SAE bearer context of the UE, such as IP bearer service parameter and network interior routing information etc. The S-GW is an anchor point of the interior user plane in the 3GPP system and there is only one S-GW for one user at one time;

a Packet Data Network (PDN) gateway (P-GW): a gateway being responsible for enable the UE to access the PDN, allocating IP address for users, and meanwhile being the mobility anchor point of the access systems of the 3GPP and the non-3GPP. The functions of the PDN GW further include: policy implementation, charging support. A user may access multiple PDN GWs simultaneously. A Policy and Charging Enforcement Function (PCEF) entity is also located in the PDN GW;

a Policy and Charging Rules Function (PCRF) entity is responsible for providing the PCEF with policy control and charging rules.

a Home Subscriber Server (HSS) for permanently storing user subscription data. The contents stored in the HSS include an International Mobile Subscriber Identification (IMSI) of the UE and the IP address of the PDN GW;

Physically, the S-GW and the PDN GW may be combined as one. The user plane network elements of the EPC system include the S-GW and the PDN GW.

A Radio Network Controller (RNC) connects to the SGSN via an Iu interface, the SGSN connects to the MME via an S3 interface, connects to the S-GW via an S4 interface, and connects to the HSS via a Gr interface; the HSS connects to the MME via an Sha interface, the MME connects to the eNodeB via an S1-MME interface, and connects to the S-GW via an S11 interface; the S-GW connects to the eNodeB via an S1-U interface, and connects to the P-GW via an S5 interface; the P-GW connects to the PDN via an SGi interface, and connects to the PCRF entity via an S7 interface, the PCRF entity connects to the PDN via a Rx+ interface.

Figure 2:
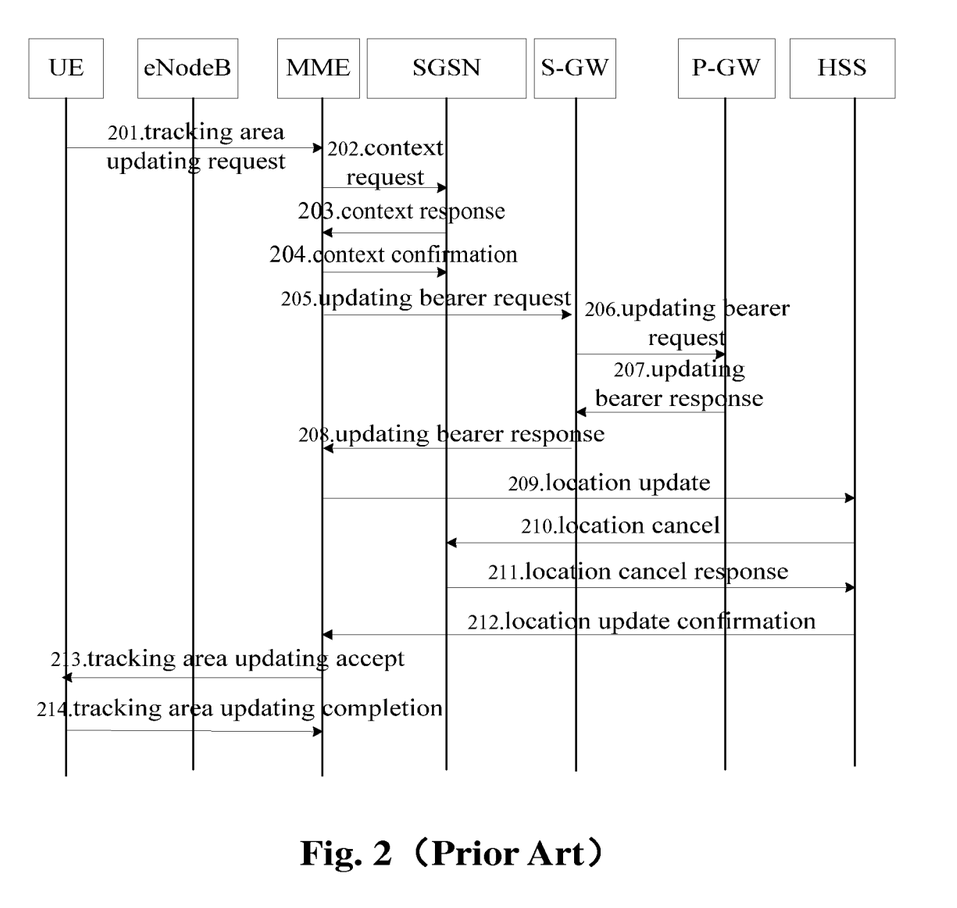
FIG. 2 is a signaling flowchart for performing normal tracking area update in accordance with the related art.

When the coverage area in which the UE resides is changed, for example, on moving from a Radio Access Technology (RAT) coverage area to another RAT coverage area, the UE finds entering a unregistered area by monitoring a broadcast channel; it is necessary for the UE to register in the new RAT coverage area to guarantee the serving continuous between the UE and the core network; therefore, the UE may initiate a Tracking Area Update (TAU) procedure or a Routing Area Update (RAU) procedure of an inter RAT. FIG. 2 is a TAU procedure caused by the UE registered in the UTRAN coverage area moving to the E-UTRAN coverage area. The RAU procedure caused by the UE registered in the E-UTRAN coverage area moving to the UTRAN coverage area is similar to that of FIG. 2, which is not described again. As shown in FIG. 2, the procedure includes the following steps:

step 201, the UE moves to the E-UTRAN coverage area of the MME, sends to the MME a tracking area updating request for registering in the new area; the request message carries a P-TMSI allocated to the UE by the SGSN;

step 202, the new MME finds an old SGSN according to the P-TMSI identification, and sends a context request signaling to perform a context acquiring process;

step 203, the old SGSN sends the mobility management and bearer information of the user to the new MME, i.e. performing the context response;

step 204, after receiving the corresponding information, the new MME confirms the context, i.e. context confirmation;

step 205, the new MME initiates to the S-GW an updating bearer request carrying a source GTP-C tunnel identification and a destination GTP-C tunnel identification; the S-GW updates the binding relationship of the bearer;

step 206, the S-GW sends to the P-GW the updating bearer request which sends parameters of the address information of the S-GW, the tunnel identification information and the accessing technology type to the P-GW;

step 207, the P-GW updates its context and returns to the S-GW an updating bearer response information carrying the address of the P-GW and the tunnel identity etc;

step 208, the S-GW returns to the new MME an updating bearer response which sends the destination GTP-C tunnel identification designated by the S-GW, the address of the S-GW, the address of the P-GW and the tunnel information to the MME;

step 209, the new MME notifies the HSS of changing the registered location via a location updating message;

step 210, the HSS keeps the single registering principle for the UE, sends a location cancel signaling to the old SGSN, and only maintains the registration of the new MME;

step 211, the old SGSN returns a location cancel response to the HSS;

step 212, the HSS confirms the location update of the new MME;

step 213, if confirming that the UE is valid within the current tracking area, the new MME sends a tracking area updating accept message to the UE;

step 214, if the new MME allocates a new GUTI identification to the UE via a TAU procedure, the UE returns a tracking area updating completion message to the MME for confirming.

Based on such a location update principle, if the UE moves frequently between the UTRAN coverage areas or the E-UTRAN coverage areas, or the frequent registering area selection caused by the signal strength and etc within the same coverage area may trigger plenty of the TAU or the RAU procedures, which causes heavy burden to air interfaces. Therefore, in an EPS system, an Idle mode Signaling Reduction (ISR) function is introduced to reduce the air interface signaling between the UE and the core network. When the function is activated, the UE having both the UTRAN and E-UTRAN accessing function may register to the MME and the SGSN at the same time. Therefore, on moving frequently between two different accessing technologies, the UE does not initiate the TAU or the RAU of the inter RAT, so as to reduce the unnecessary air interface signaling transmission.

Figure 3:
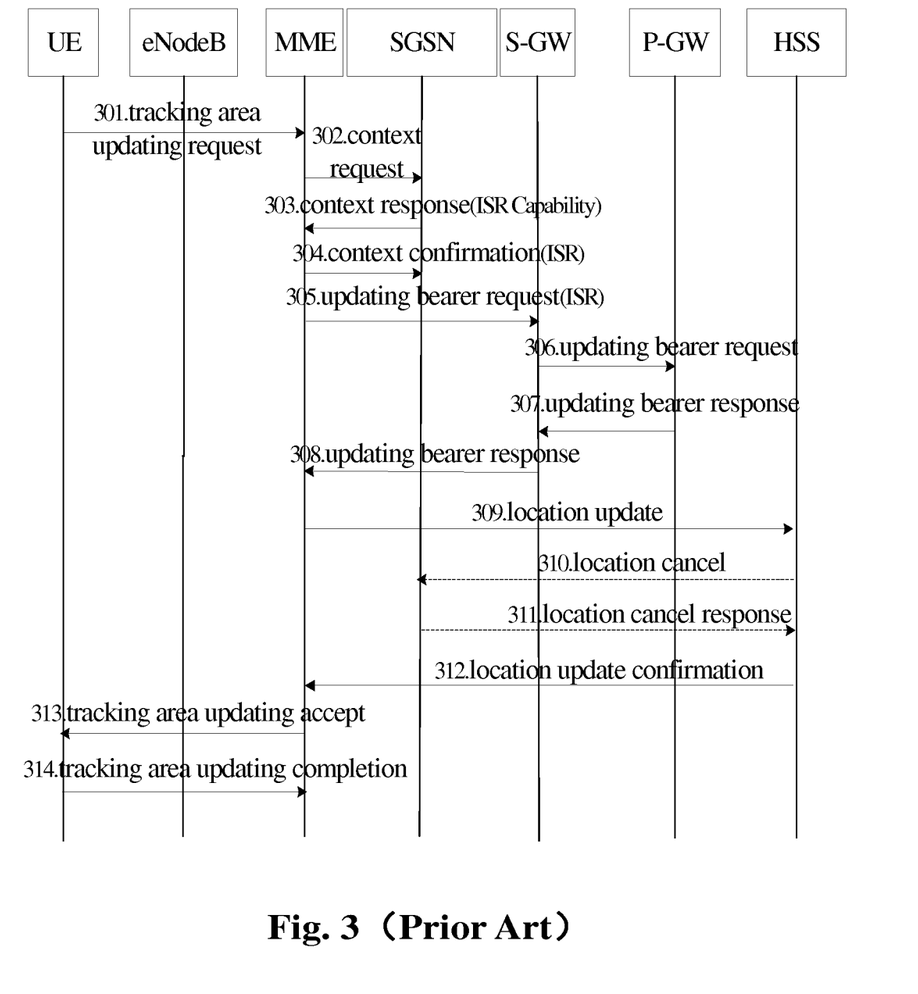
FIG. 3 is a signaling flowchart for activating the ISR function via a tracking area update procedure in accordance with the related art.

The procedure of the ISR activating by the UE is also implemented through the TAU or the RAU procedure, however, there are differences of some steps. The differences between the above two procedures are hereinafter described in detail by taking that the ISR function is activated by using the TAU procedure of FIG. 3 for example. As shown in FIG. 3, the procedure includes the following steps:

step 301, the UE moves to the E-UTRAN coverage area of the MME, sends to the MME the tracking area updating request carrying the capability of whether the UE supports the ISR apart from the P-TMSI allocated to the UE under the SGSN;

step 302, the new MME finds the old SGSN according to the P-TMSI identification, and sends the context request signaling to perform the context acquiring process;

step 303, the old SGSN sends the mobility management and bearer information of the user to the new MME, and carries the capability of whether the old SGSN supports the ISR in the returned context response message;

step 304, the new MME determines whether to activate the ISR according to the context information received from the old SGSN; if it is necessary for activating the ISR, the new MME returns to the old SGSN the context confirmation message which carries an ISR indication for notifying the old SGSN of keeping the original context information of the UE;

step 305, the new MME initiates to the S-GW the updating bearer request carrying the source GTP-C tunnel identification and the destination GTP-C tunnel identification; the S-GW updates the binding relationship of the bearer. The updating bearer request message further includes the activating ISR indication for notifying the S-GW of keeping the bearer context information of the UE under the old SGSN.

step 306, since the RAT is changed, the S-GW sends the updating bearer request to the P-GW;

step 307, the P-GW updates its context and returns the updating bearer response message to the S-GW;

step 308, the S-GW returns to the new MME the updating bearer response carrying the destination GTP-C tunnel identification designated by the S-GW, the address of the S-GW, the address of the P-GW and the tunnel information etc;

step 309, the new MME notifies the HSS of location change via the location updating message, and notifies the HSS of the ISR activating information via a corresponding identification, then the HSS keeps the dual registration information of the E-UTRAN domain and the UTRAN domain, does not send the location cancel information to the old SGSN;

For the above corresponding identification information, the dual registration is currently indicated by the existing information element of location updating type.

step 310, it is determined whether the UE activates the ISR; if the HSS does not keep the dual registration of the UE, it sends the location cancel signaling to the SGSN; if the ISR is activated, the HSS keeps two PS domain registration of the UE, it does not send the location cancel signaling to the old SGSN, which belongs to the second case in the procedure;

step 311, if the SGSN receives the location cancel signaling, it returns a location cancel response to the HSS; corresponding to step 310, it is not necessary to return the location cancel response in the procedure;

step 312, the HSS confirms the location update of the new MME;

step 313, if confirming that the UE is valid within the current tracking area, the new MME sends the tracking area updating accept message to the UE; the MME notifies the UE that the ISR function is activated by an indication in the message;

step 314, if the new MME allocates a new GUTI identification to the UE via the TAU procedure, the UE returns the tracking area updating completion message to the MME for confirming.

When the ISR is activated, the S-GW keeps the bearer information of two access networks at the same time, it is necessary to distinguish the control plane information from the MME or from the SGSN, so as to guarantee that the bearer accessing network is operated correctly. The control plane information between the MME and the SGSN is transmitted via the GTP-C tunnel; the source terminal and the destination terminal of the tunnel are identified by using the TEID.

As can be seen from the above description, the S-GW is notified to activate the ISR function via the updating bearer request of step 305 at present, and the message indicates the S-GW to bind the new bearer information and the original bearer information to the GTP-C tunnel identification of the same destination. In this way, the S-GW is unable to distinguish the subsequent control plane signaling from which mobility management unit; therefore, the corresponding bearer can not be updated or released.

SUMMARY OF THE INVENTION

The present invention is provided taking into account that the S-GW is unable to distinguish the subsequent control plane signaling from which mobility management entity and the corresponding bearer can not be updated or released; therefore, the major objective of the present invention is to provide a bearer processing solution, so as to solve at least one of the above problems.

According to one aspect of the present invention, a bearer processing method is provided for a serving gateway to perform the bearer processing.

The bearer processing method according to an embodiment of the present invention includes: the serving gateway receiving a bearer processing message from the mobility management unit, wherein the bearer processing message carries a message source mark for identifying a sending entity of the bearer processing message; the serving gateway acquiring the message source mark in the bearer processing message, judging the sending entity of the bearer processing message according to the message source mark, and performing the bearer processing according to the result of the judgment.

According to another aspect of the present invention, a bearer processing method is provided for a serving gateway to perform the bearer processing.

The bearer processing method according to an embodiment of the present invention includes: the serving gateway acquiring a bearer processing message from a mobility management unit, wherein the bearer processing message carries a message source mark in the case that the sending entity of the bearer message is the mobility management entity; the serving gateway judging whether the bearer processing message carries the message source mark, determining the sending entity of the bearer processing message according to the result of the judgment, and performing the bearer processing according to the determined sending.

By at least one of the above technical solutions of the present invention, it is possible for the serving gateway to distinguish the sending entity of a message, so as to perform the subsequent related bearer processing.

Other features and advantages of the present invention will be described in the following description and, in part, will be obvious from the description, or may be understood by practice of the invention. The objectives and other advantages of the present invention may be implemented and achieved by the written description, claims and the structures indicated particularly in the accompanying drawings.

BRIEF DESCRIPTION OF THE DRAWINGS

The accompanying drawings are used for further understanding the present invention and constitute a part of the application, and are used for further explaining the present invention with the illustrative embodiments of the present invention and not for limiting the protection scope thereof. In the accompanying drawings.

DETAILED DESCRIPTION OF THE EMBODIMENTS

Function Summary

As described above, the new bearer information and the original bearer information are bound to the GTP-C tunnel identification of the same destination in the related bearer message at present; in this way, the S-GW is unable to distinguish the subsequent control plane signaling from which mobility management unit, therefore, the corresponding bearer can not be updated or released. A message source distinguishing method and a bearer processing method are provided in embodiments of the present invention for a serving gateway performing the bearer processing, the bearer processing method includes: the serving gateway receiving a bearer processing message from the mobility management unit, wherein the bearer processing message carries a message source mark for identifying a sending entity of the bearer processing message; the serving gateway acquiring the message source mark in the bearer processing message, and judging the sending entity of the bearer processing message according to the message source mark, and performing the bearer processing according to the result of the judgment.

A detailed description of the present invention is provided hereinafter with reference to attached drawings and specific embodiments. It should be understood that, the preferable embodiments offered herein are used for explaining the present invention only and shall not be used for limiting the protection scope of the present invention.

Method Embodiment

Figure 4:
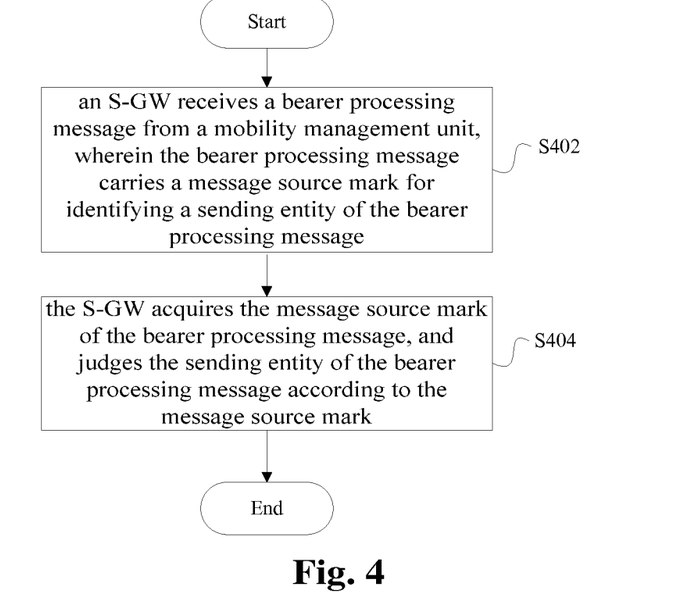
FIG. 4 is a flowchart of a message source distinguishing method in accordance with an embodiment of the present invention.

A message source distinguishing method is first provided according to an embodiment of the present invention for an S-GW to distinguish the sending entity of the bearer processing message. FIG. 4 is a flowchart of the message source distinguishing method in accordance with the embodiment of the present invention; as shown in FIG. 4, the procedure includes the following processing:

step S402, an S-GW receives a bearer processing message from a mobility management unit, wherein the bearer processing message carries a message source mark for identifying a sending entity of the bearer processing message;

step S404, the S-GW acquires the message source mark in the bearer processing message, and judges the sending entity of the bearer processing message according to the message source mark.

It should be noted that, in the following description, the mentioned mobility management unit or message sending entity may be an MME or an SGSN; the mentioned bearer processing message may be a bearer updating request message or a bearer/session releasing request message.

Figure 5:
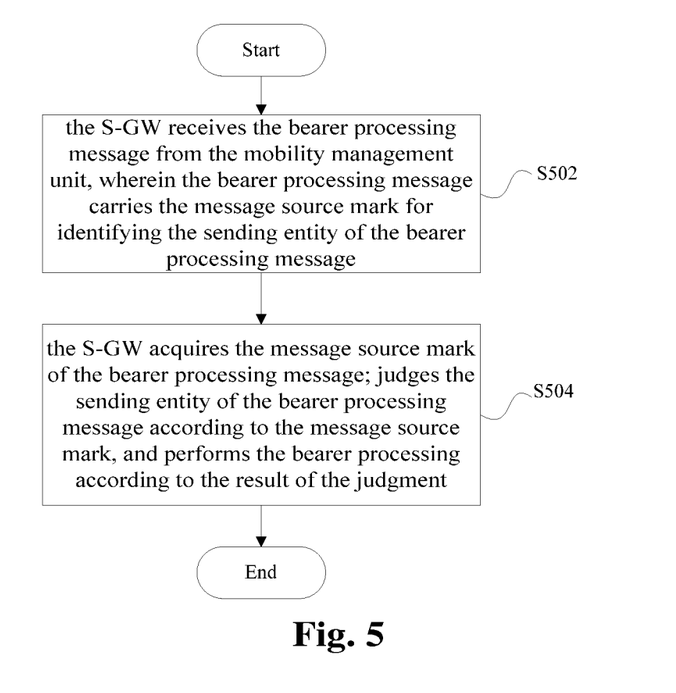
FIG. 5 is a flowchart of a bearer processing method in accordance with an embodiment of the present invention.

A bearer processing method is provided according to an embodiment of the present invention for the S-GW performing the bearer processing. FIG. 5 is a flowchart of the method; as shown in FIG. 5, the procedure includes the following processing:

step S502, the S-GW receives the bearer processing message from the mobility management unit, wherein the bearer processing message carries the message source mark for identifying the sending entity of the bearer processing message;

step S504, the S-GW acquires the message source mark in the bearer processing message; judges the sending entity of the bearer processing message according to the message source mark, and performs the bearer processing according to the result of the judgment.

Specifically, in step S504, in the case that the sending entity of the bearer processing message is judged as the MME, the S-GW performs the processing for its bearer associated with the MME; in the case that the sending entity of the bearer processing message is judged as the SGSN, the S-GW performs the processing for its bearer associated with the SGSN. Wherein, the processing of bearer may be updating or releasing processing, which will be hereinafter described in detail.

The above description is a technical solution that the message source mark is carried in the bearer processing message for distinguishing the sending entity; for example, the different sending entities may be identified by means of the value of the message source mark, such as, the message source mark may occupy one information element of the bearer processing message, when the value of the information element is "1", it is represented that the sending entity is the MME; when the value of the information element is "0", it is represented that the sending entity is the SGSN; alternatively, when the value of the information element is "0", it is represented that the sending entity is the MME; when the value of the information element is "1", it is represented that the sending entity is the SGSN. In fact, the present invention is not limited as above, and another implementing solution is hereinafter given.

Figure 6:
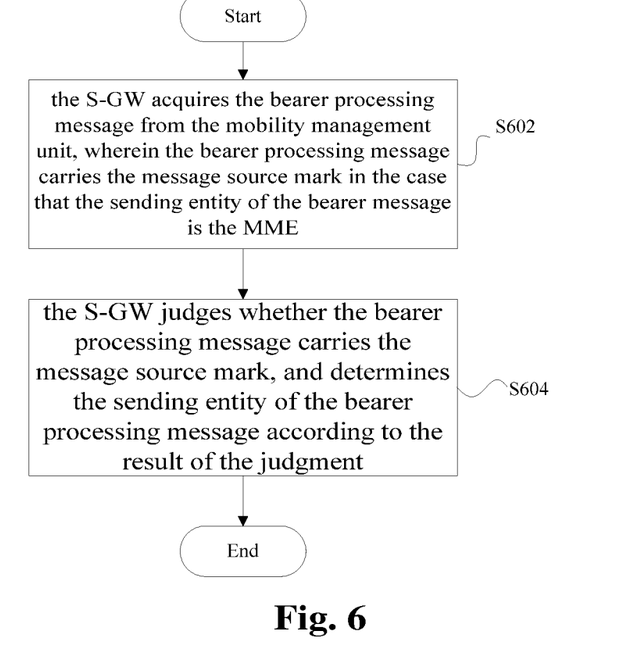
FIG. 6 is a flowchart of another message source distinguishing method in accordance with an embodiment of the present invention.

A message source distinguishing method is provided according to an embodiment of the present invention for the S-GW distinguishing the message source. FIG. 6 is a flowchart of the method; as shown in FIG. 6, the procedure includes the following processing:

step S602, the S-GW acquires the bearer processing message from the mobility management unit, wherein the bearer processing message carries the message source mark in the case that the sending entity of the bearer message is the MME;

step S604, the S-GW judges whether the bearer processing message carries the message source mark, and determines the sending entity of the bearer processing message according to the result of the judgment.

Specifically, in step S604, in the case that the S-GW determines that the bearer processing message carries the message source mark, the sending entity of the bearer processing message is determined as the MME; otherwise, the sending entity of the bearer processing message is not determined as the MME.

Figure 7:
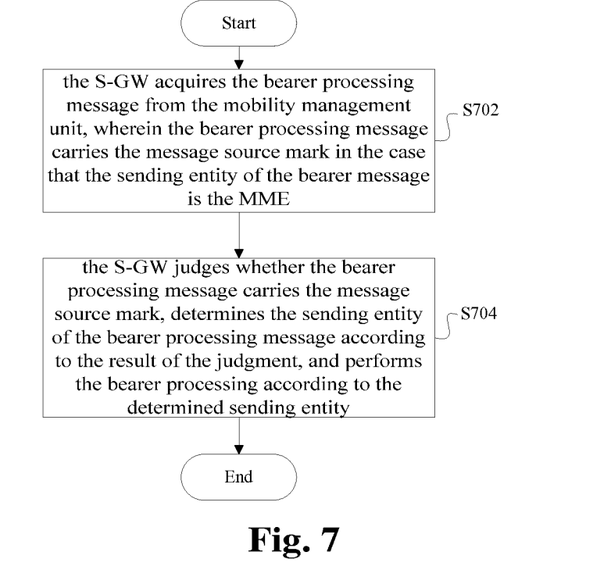
FIG. 7 is a flowchart of another bearer processing method in accordance with an embodiment of the present invention.

According to an embodiment of the present invention, another bearer processing method is provided for the S-GW performing the bearer processing. FIG. 7 is a flowchart of the method; as shown in FIG. 7, the procedure includes the following processing:

step S702, the S-GW acquires the bearer processing message from the mobility management unit, wherein the bearer processing message carries the message source mark in the case that the sending entity of the bearer message is the MME;

step S704, the S-GW judges whether the bearer processing message carries the message source mark, determines the sending entity of the bearer processing message according to the result of the judgment, and performs the bearer processing according to the determined sending entity.

Specifically, in step S704, in the case that the S-GW determines that the bearer processing message carries the message source mark, the sending entity of the bearer processing message is determined as the MME, and the bearer associated with the MME is processed; in the case that the S-GW determines that the bearer processing message does not carry the message source mark, the sending entity of the bearer processing message is determined as the SGSN, and the bearer associated with the SGSN is processed. Wherein, the processing of bearer may be updating or releasing processing, which will be hereinafter described in detail.

The main difference between the above technical solution and the first solution is that, the message sending entity is represented by means of whether there is a message source mark instead of by means of the value of the message source mark; herein, the message source mark may also occupy one information element of the bearer processing message.

Preferred embodiments of the present invention are hereinafter described by taking the bearer updating request message and the bearer/session releasing request message for example.

Figure 8:
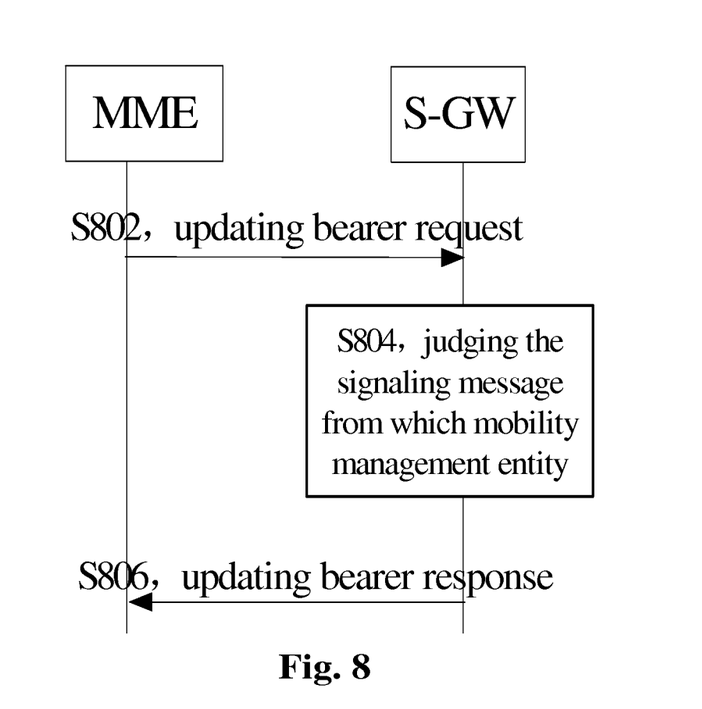
FIG. 8 is a schematic diagram of the signaling interaction procedure of a bearer updating process of an MME and an S-GW in accordance with the first embodiment of the present invention.

Embodiment 1: the bearer updating procedure of the MME and the S-GW upon activating the ISR FIG. 8 is a flowchart of the bearer updating signaling interaction of the MME and the S-GW when the ISR is activated. As shown in FIG. 8, the procedure includes the following steps 802-806:

step 802, the MME sends to the S-GW the updating bearer request carrying the bearer related information of which the bearer ID is to be updated. Since the ISR is activated, the MME further needs to carry an MME message source mark in the updating bearer request message;

the message source mark may be implemented by adding one information element to the updating bearer request message; the mark is used for indicating the updating bearer request from which entity, such as the MME or the SGSN. As described above, the value of the information element includes, but is not limited to the follow modes: the MME and the SGSN allocate the message source marks with different values to represent the message sources; alternatively, only the MME fills the message source mark while the SGSN does not fill the message source mark; if the information element is empty, it is represented that the message is from the SGSN;

step 804, after receiving the updating bearer request message, the S-GW analyzes whether the request message contains the MME message source mark. Since the request message contains the MME message source mark, the S-GW regards that the updating bearer request message is sent by the MME.

step 806, according to the judgment of step 804, the S-GW updates the bearer established between the MME and the S-GW, and returns an updating bearer response message to the MME.

In accordance with the above embodiment, the bearer update procedure of the MME and the S-GW is implemented.

Figure 9:
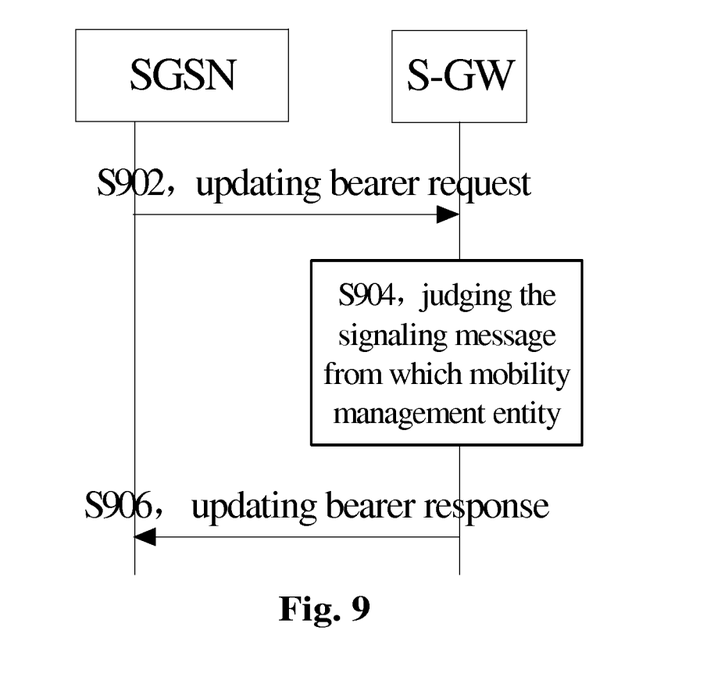
FIG. 9 is a schematic diagram of the signaling interaction procedure of a bearer updating process of an SGSN and an S-GW in accordance with the second embodiment of the present invention.

Embodiment 2: the bearer updating procedure of the SGSN and the S-GW upon activating the ISR FIG. 9 is a flowchart of the bearer updating signaling interaction of the SGSN and the S-GW when the ISR is activated. As shown in FIG. 9, the procedure includes the following steps 902-906:

step 902, the SGSN sends to the S-GW the updating bearer request carrying the bearer related information of which the bearer ID is to be updated. Since the ISR is activated, the SGSN further needs to carry an SGSN message source mark in the updating bearer request message;

the message source mark may be implemented by adding one information element to the updating bearer request message; the mark is used for indicating the updating bearer request from which entity, such as the MME or the SGSN.

The value of the information element includes, but is not limited to the follow modes: the MME and the SGSN allocate the message source marks with the different values to represent the message sources; alternatively, only the MME fills the message source mark while the SGSN does not fill the message source mark; if the information element is empty, it is represented that the message is from the SGSN;

step 904, after receiving the updating bearer request message, the S-GW analyzes whether the request message contains the MME message source mark. Since the request message contains the SGSN message source mark instead of the MME message source mark, the S-GW regards that the updating bearer request message is sent by the SGSN.

step 906, according to the judgment of step 904, the S-GW updates the bearer established between the SGSN and the S-GW, and returns the updating bearer response message to the SGSN.

In accordance with the above embodiment, the bearer update procedure of the SGSN and the S-GW is implemented.

Figure 10:
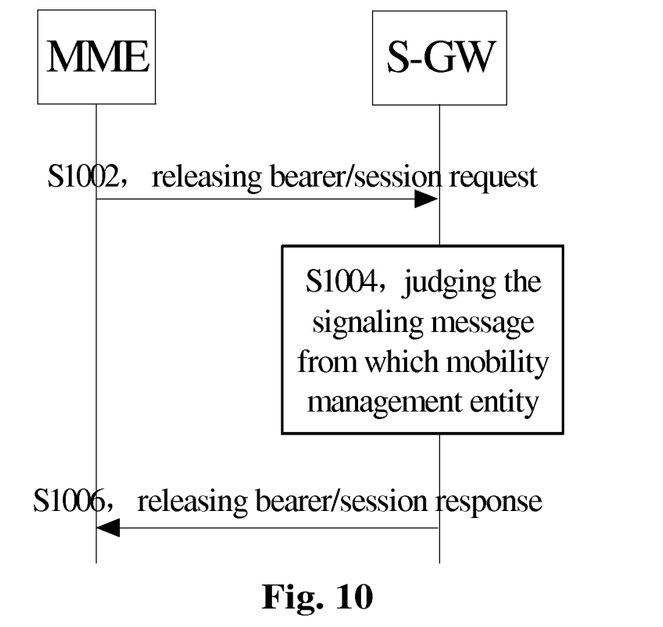
FIG. 10 is a schematic diagram of the signaling interaction procedure of a bearer releasing process of an MME and an S-GW in accordance with the third embodiment of the present invention.

Embodiment 3: the bearer releasing procedure of the MME and the S-GW upon activating the ISR FIG. 10 is a flowchart of the releasing bearer signaling interaction of the MME and the S-GW when the ISR is activated. As shown in FIG. 10, the procedure includes the following steps 1002-1006:

step 1002, the MME sends to the S-GW a bearer/session releasing request carrying the bearer related information of which the bearer ID is to be released. Since the ISR is activated, the MME further needs to carry the MME message source mark in the bearer releasing request message;

the message source mark may be implemented by adding one information element to the bearer releasing request message; the mark is used for indicating from which entity the bearer/session releasing request comes, such as the MME or the SGSN. The value of the information element includes, but is not limited to the follow modes: the MME and the SGSN allocate the message source marks with the different values to represent the message sources; alternatively, only the MME fills the message source mark while the SGSN does not fill the message source mark; if the information element is empty, it is represented that the message is from the SGSN;

step 1004, after receiving the bearer/session releasing request message, the S-GW analyzes whether the request message contains the MME message source mark. Since the request message contains the MME message source mark, the S-GW regards that the bearer/session releasing request message is sent by the MME;

step 1006, according to the judgment of step 1004, the S-GW releases the bearer established between the MME and the S-GW, and returns a bearer/session releasing response message to the MME.

In accordance with the above processing, the bearer releasing procedure of the MME and the S-GW is implemented.

Figure 11:
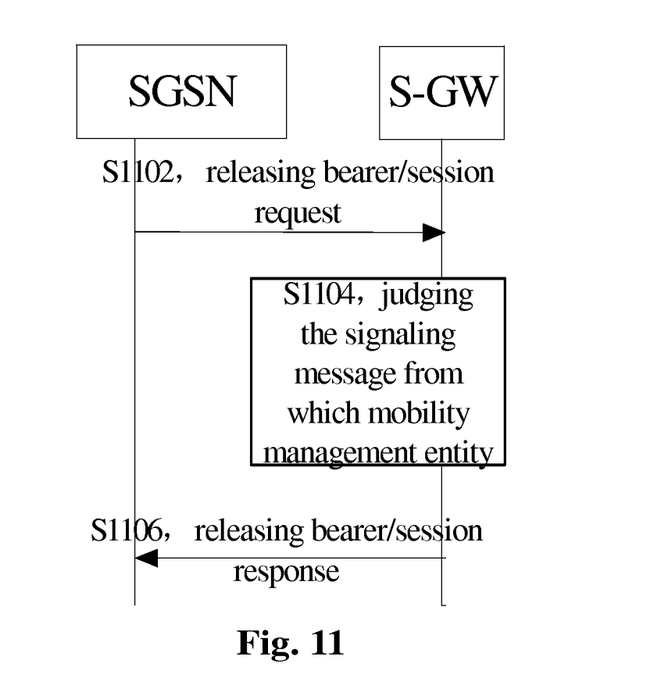
FIG. 11 is a schematic diagram of the signaling interaction procedure of a bearer releasing process of an SGSN and an S-GW in accordance with the fourth embodiment of the present invention.

Embodiment 4: the bearer releasing procedure of the SGSN and the S-GW upon activating the ISR FIG. 11 is a flowchart of the releasing bearer signaling interaction of the SGSN and the S-GW when the ISR is activated. As shown in FIG. 11, the procedure includes the following steps 1102-1106:

step 1102, the SGSN sends to the S-GW the bearer/session releasing request carrying the bearer related information of which the bearer ID is to be released. Since the ISR is activated, the SGSN further needs to carry the SGSN message source mark in the bearer/session releasing request message;

the message source mark may be implemented by adding one information element to the bearer/session releasing request message; the mark is used for indicating the bearer/session releasing request from which entity, such as the MME or the SGSN. The value of the information element includes, but is not limited to the follow modes: the MME and the SGSN allocate the message source marks with the different values to represent the message sources; alternatively, only the MME fills the message source mark while the SGSN does not fill the message source mark; if the information element is empty, it is represented that the message is from the SGSN;

step 1104, after receiving the bearer/session releasing request message, the S-GW analyzes whether the request message contains the MME message source mark. Since the request message contains the SGSN message source mark instead of the MME message source mark, the S-GW regards that the bearer releasing request message is sent by the SGSN;

step 1106, according to the judgment of step 1104, the S-GW releases the bearer established between the SGSN and the S-GW, and returns a bearer/session releasing response message to the SGSN.

In accordance with the above embodiment, the bearer releasing procedure of the SGSN and the S-GW is implemented.

To sum up, in accordance with the technical solutions of the present invention, the serving gateway may distinguish the control plane signaling associated with the update/delete bearer from which mobility management unit, so as to perform the update or delete operation for the corresponding bearer.

The foregoing is only preferred embodiments of the present invention and is not for limiting the protection scope thereof, and for those skilled in the art, there may be various modifications and changes to the present invention. Any modification, equivalent replacement and improvement made under the spirit and principle of the present invention should be included in the protection scope thereof.

The invention claimed is:

1. A bearer processing method for a serving gateway to perform the bearer processing, comprising:
    the serving gateway receiving a bearer processing message from a mobility management unit, wherein the bearer processing message carries a message source mark for identifying a sending entity of the bearer processing message; and
    the serving gateway acquiring the message source mark in the bearer processing message, judging the sending entity of the bearer processing message according to the message source mark, and performing the bearer processing according to the result of the judgment;
    wherein the sending entity comprises one of the following: a mobility management entity, a serving GPRS supporting node;
    wherein the serving gateway performing the processing for its bearer associated with the mobility management entity in the case that the sending entity of the bearer processing message is judged as the mobility management entity;
    the serving gateway performing the processing for its bearer associated with the serving GPRS supporting node in the case that the sending entity of the bearer processing message is judged as the serving GPRS supporting node.

2. The method according to claim 1, wherein the bearer processing message comprises one of the following: a bearer updating request message, a bearer session releasing request message.

3. The method according to claim 1, wherein the message source mark occupies one information element of the bearer processing message.

4. A bearer processing method for a serving gateway to perform the bearer processing, comprising:

the serving gateway acquiring a bearer processing message from a mobility management unit, wherein the bearer processing message carries a message source mark in the case that the sending entity of the bearer message is the mobility management entity; and the serving gateway judging whether the bearer processing message carries the message source mark, determining the sending entity of the bearer processing message according to the result of the judgment, and performing the bearer processing according to the determined sending entity;

wherein the sending entity comprises one of the following: the mobility management entity, a serving GPRS supporting node;

wherein in the case that the serving gateway determines that the bearer processing message carries the message source mark, the sending entity of the bearer processing message is determined as the mobility management entity, and the bearer associated with the mobility management entity is processed;

in the case that the serving gateway determines that the bearer processing message does not carry the message source mark, the sending entity of the bearer processing message is determined as the serving GPRS supporting node, and the bearer associated with the serving GPRS supporting node is processed.

5. The method according to claim 4, wherein in the case that the serving gateway determines that the bearer processing message carries the message source mark, the sending entity of the bearer processing message is determined as the mobility management entity; otherwise, the sending entity of the bearer processing message is not determined as the mobility management entity.

6. The method according to claim 4, wherein the bearer processing message comprises one of the following: a bearer updating request message, a bearer/session releasing request message.

7. The method according to claim 4, wherein the message source mark occupies one information element of the bearer processing message.

8. A bearer processing method for a serving gateway to perform the bearer processing, comprising:

the serving gateway acquiring a bearer processing message from a mobility management unit, wherein the bearer processing message carries a message source mark in the case that the sending entity of the bearer message is the serving GPRS supporting node; and the serving gateway judging whether the bearer processing message carries the message source mark, determining the sending entity of the bearer processing message according to the result of the judgment, and performing the bearer processing according to the determined sending entity;

wherein in the case that the serving gateway determines that the bearer processing message carries the message source mark, the sending entity of the bearer processing message is determined as the serving GPRS supporting node; otherwise, the sending entity of the bearer processing message is not determined as the serving GPRS supporting node;

wherein the case that the serving gateway determines that the bearer processing message carries the message source mark, the sending entity of the bearer processing message is determined as the serving GPRS supporting node, and the bearer associated with the serving GPRS supporting node is processed; and in the case that the serving gateway determines that the bearer processing message does not carry the message source mark, the sending entity of the bearer processing message is determined as the mobility management entity, and the bearer associated with the mobility management entity is processed.

9. The method according to claim 8, wherein the sending entity comprises one of the following: a mobility management entity, the serving GPRS supporting node.

10. The method according to claim 8, wherein the bearer processing message comprises one of the following: a bearer updating request message, a bearer/session releasing request message.

11. The method according to claim 8, wherein the message source mark occupies one information element of the bearer processing message.

* * * * *